United States Patent [19]

Grosse

[11] Patent Number: 5,551,184
[45] Date of Patent: Sep. 3, 1996

[54] FISHING ROD BUTT PAD

[76] Inventor: Charles A. Grosse, 1931 Glasgow Ave., Cardiff, Calif. 92007

[21] Appl. No.: 316,846

[22] Filed: Oct. 3, 1994

[51] Int. Cl.⁶ ........................................ A01K 87/00
[52] U.S. Cl. ........................ 43/25; 43/21.2; 43/23
[58] Field of Search ..................... 43/25, 21.2, 23, 43/18.1; D22/147; 224/922; 206/315.11

[56] References Cited

U.S. PATENT DOCUMENTS

| | | | |
|---|---|---|---|
| 2,144,122 | 1/1939 | Pflueger | 43/25 |
| 3,159,939 | 12/1964 | Transeau | 43/21.2 |
| 3,466,783 | 9/1969 | Priebe, Jr. | 43/23 |
| 3,468,052 | 9/1969 | Hardesty et al. | 43/23 |
| 4,653,315 | 3/1987 | Strader | 43/18.1 |
| 4,920,682 | 5/1990 | Andreasen et al. | 43/23 X |
| 5,369,904 | 12/1994 | Vogts et al. | 43/18.1 |

FOREIGN PATENT DOCUMENTS 2462864  3/1981  France .................... 43/21.2

*Primary Examiner*—Samuel M. Heinrich
*Assistant Examiner*—Jeanne M. Elpel
*Attorney, Agent, or Firm*—John J. Murphey; Murphy Law Offices

[57] ABSTRACT

An elastic portable cushion for enveloping the butt-end of a fishing rod for interposition with the fisher-person's body, to protect the body when fighting a fish, the cushion having the property of generally retaining its shape during use and defined by an outer surface having a high coefficient of friction including first device formed therein for receiving the butt-end of the rod in temporary fixed position therein, the device comprising a passageway, of equal or lesser diameter than the butt-end of the fishing rod, passing into the cushion.

29 Claims, 4 Drawing Sheets

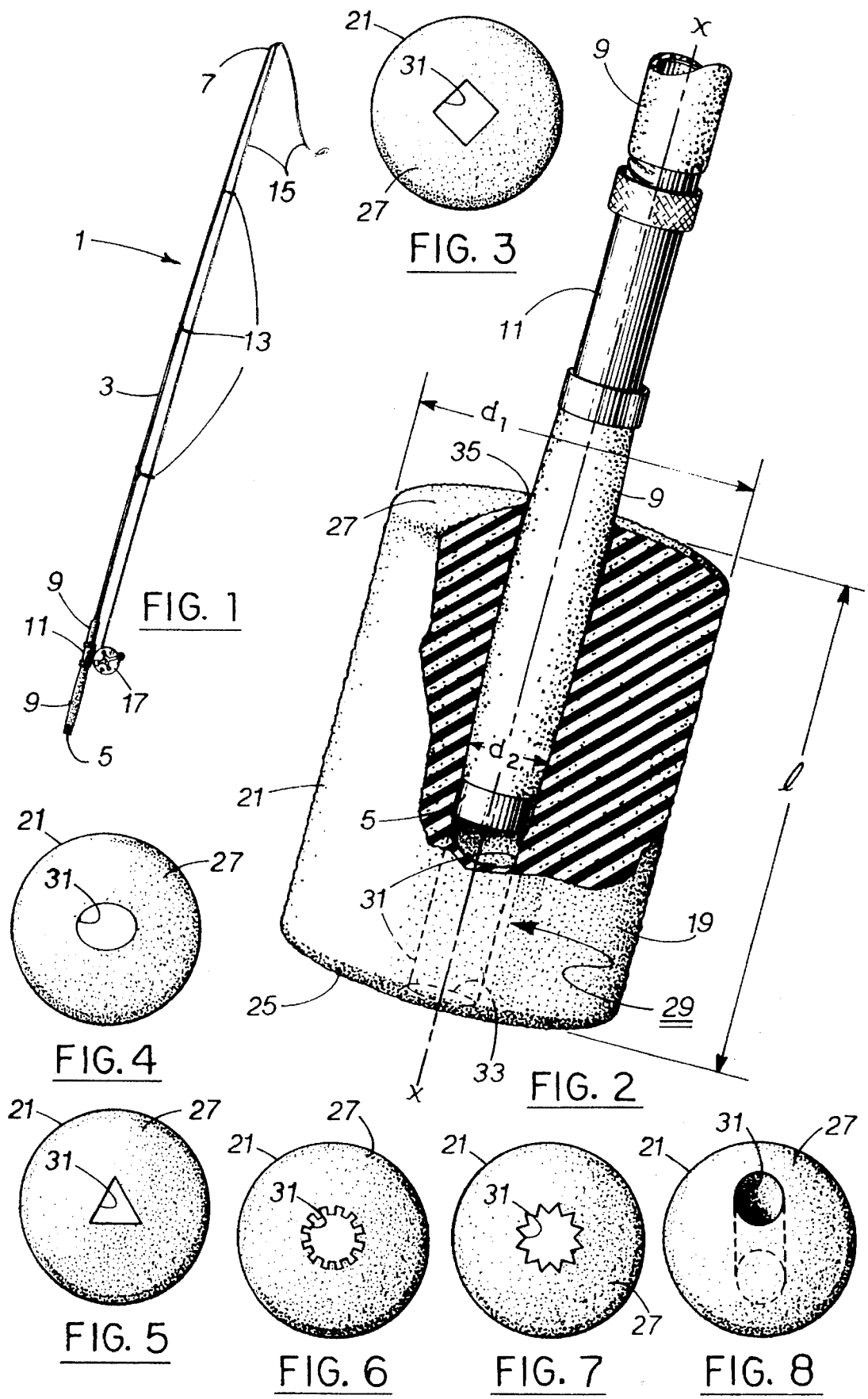

FISHING ROD BUTT PAD

BACKGROUND OF THE INVENTION

1. Field of the Invention

This invention pertains to the field of sport accessories. More particularly, it pertains to a pad or cushion for enveloping the butt-end of a fishing rod and interposition between the butt-end and the body of the fisher-person to reduce the incidence of trauma occasioned to the fisher-person's body by the action of the fishing rod when fighting a large or energetic denizen of the deep.

2. Description of the Prior Art

The art of fishing has progressed from the net, to the spear to the fishing rod. Many people partake in the sport of capturing fish through the use of a fishing rod, utilizing an extended flexible line at which forward end is located a hook that is baited to attract fish thereto. Upon the occasion of a fish taking the bait, the rod is jerked upward to straighten the line and set the hook into the fish's mouth and thereafter the reel, mounted on the rod, is wound to take in the line and bring the fish towards the fisher-person.

Fish come in all sizes and shapes; the smallest such as the blue gill, bream or trout, that are of such small size and light weight that the fisher-person can manipulate the rod using only their hand, fighting the fish and ultimately winding the line in to bring the fish to bay. However, there are larger fish weighing upwards of many pounds and hundreds of pounds that are commonly captured by the same type rod and reel. In these cases, however, the fisher-person must lever the rod against their body to provide a mechanical advantage to aid in reeling in the fighting fish.

Levering a rod is commonly done by pressing the lower or butt-end of the rod against one's body while holding the rod at the handle portion and using the other free hand to operate the reel to wind in the line. Some people have sufficient musculature and physical strength to enable them to easily rest the butt-end of the rod against their stomach or abdomen without injury and wind the fishing reel to capture the fish.

However, a large number of persons fish for these medium to large-size fish as sport and do not display the physical characteristics sufficient to allow them to,safely place the butt-portion of the rod against their body to reel in the fish without causing injury to themselves such as deep bruises in the skin or underlying tissue or, more seriously, laceration of the skin.

The prior art has attempted to rectify this problem by providing a leather belt for wearing about one's midriff or waist that contains a forward-facing cup-like prominence into which the fisher-person places the butt-end of the rod when reeling in a sizeable fish. Unfortunately, these belts are uncomfortable when not in use and are not easily transferred from fisher-person to fisher-person without significant manipulation of the free ends. In many cases, a single rod or a few rods are used in trolling for the fish while a number of individuals stand by to take their turn at fighting whatever fish has taken the bait or lure. This requires that each person wear a separate leather belt. These belts are expensive, are not often used except in certain situations such as described herein, and many fisher-persons are not interested in carrying such a device with them throughout a vacation, a holiday trip or on a particular fishing venture.

Some thought has been given to mounting a cushion permanently at the end of the fishing rod; however, this has not become popular because the cushion attracts slime, scales, dirt and excrement from the captured fish and later produces a vile odor that is not conducive to family relationships when the fisher-person parks the rod in a bedroom, closet or other portion of the living quarters. The potential for abdominal injury or at least significant discomfort when using a rod without such a device poses such a problem that it has discouraged a number of persons from participating in sport fishing of medium to large size fish or has actually caused the loss of a fish during a fight.

SUMMARY OF THE INVENTION

This invention is a unique accessory for use in fishing with a fishing rod for medium to large-sized fish, wherein the need arises for a protective device to prevent the butt-portion of the fishing rod from causing injury to the body of the fisher-person. This novel accessory comprises an elastic, portable cushion for enveloping the butt-end of the fishing rod for interposition said butt-end and any portion of the fisher-person's body. The unique aspect of this invention is that the cushion is easily attached to the butt-end of the rod, accommodates a wide variety of sizes and shapes of rods, and is thereafter easily removed to be placed with another fishing rod should the fisher-person decide to change rods during a fishing spree. It need not be worn by anyone but may be temporarily attached to the rod to await use.

The means by which the cushion is attached to the rod is unique in that the cushion may be used in a number of different configurations to provide the comfort and safety heretofore absent from products of this type. Further, certain rods are gimbaled or have directional features built into thee butt-end of the rod so that the rod may be controlled or held in a variety of positions during the fishing action. The cushion of this invention accommodates these types of rods and provides means to hold the rods in a fixed position to permit the fisher-person to utilize the rod and accompanying lures to best advantage.

Accordingly, the main object of this invention is a cushion adaptable to the butt-end of a fishing rod to prevent the fisher-person from suffering injury while the rod is being levered in the process of capturing and reeling in a medium to large fish. Other objects of the invention include a cushion that is adaptable for interfitting on a number of different rods so that the fisher-person is not required to wear an implement throughout the entire fishing trip; a cushion that is easily attached at the time the rod becomes useful as a means to catch the fish; a cushion that may be used in a number of different positions to provide safety and comfort to the fisher person; a cushion that is easily separated from the rod and thereafter cleaned of materials that normally are present in the capture of fish and that would otherwise provide a noxious environment to those standing or sitting nearby; a cushion that may be easily attached to virtually any fishing rod without the need for intensive or extended training of the individual using the cushion; a cushion that allows the fisher-person more actual control over the fishing rod to ensure the appropriate and positive capture of a fish so as not to allow an injured fish to remain in the water; and, a cushion that utilizes materials that do not suffer the surrounding community with any sort of environmental pollution.

These and other objects of the invention may be determined from a reading of the specification taking into account the drawings that are attached hereto. The scope of protection sought by the inventor may be gleaned from a fair reading of the claims that conclude this specification.

DESCRIPTION OF THE DRAWINGS

FIG. 1 is an illustrative view of the conventional fishing rod to which this invention is applicable;

FIGS. 2 is a trimetric illustrative view of the basic cushion of this invention;

FIGS. 3–8 are end views of the cushion shown in FIG. 2 illustrating the various configurations of the passageway and the alignment of them in the cushion;

DESCRIPTION OF THE PREFERRED EMBODIMENT

Figure 9:
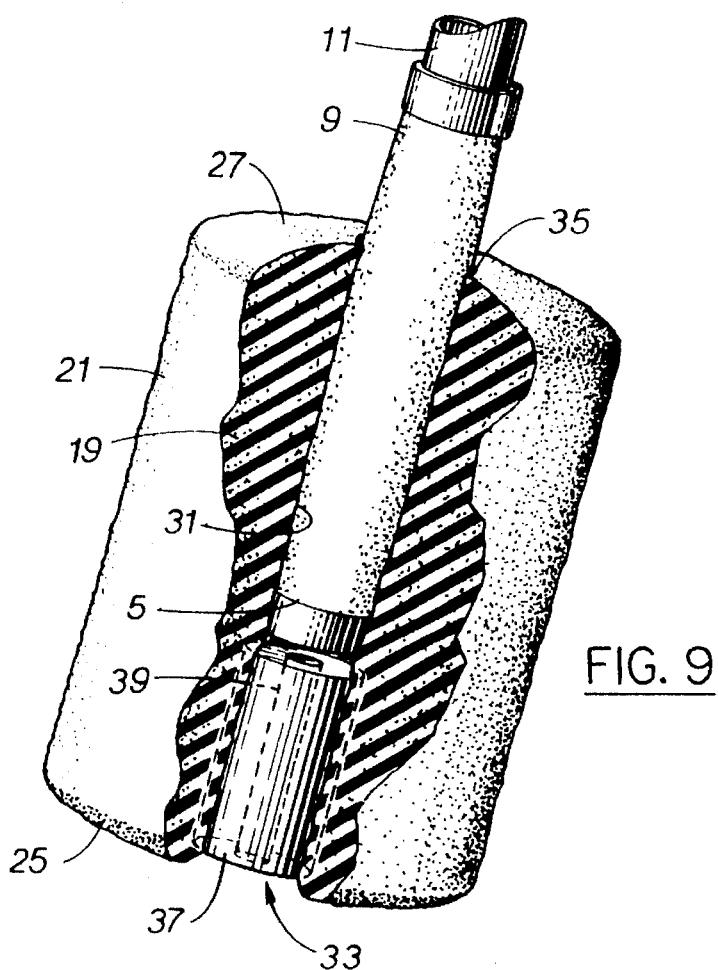
FIG. 9 is a trimetric illustrative view of another embodiment of the invention showing the use of a plug in the passageway to prevent the butt-end of the rod from passing completely through the cushion.

Turning now to the drawings wherein like elements are identified with like numerals throughout the twenty figures, FIG. 1 shows a typical fishing rod 1 to comprise a elongated, tapered, conical rod body 3 including a butt-end 5 and a tip-end 7 spaced-apart therefrom. At least one, but preferably two handles or grips 9 are located above butt-end 5, intermediate ends 3 and 5, and a fishing reel attachment fixture 11 is mounted on body 3 intermediate handles 9. A plurality of guides 13 are spaced along rod body 3 to carry a fishing line 15 wound about a reel 17 from said reel outward along said rod for use beyond tip-end 7.

As shown in FIG. 2, this invention comprises an elastic, portable cushion 19 arranged to envelop rod butt-end 5 for interposition therewith and the fisher-person's body to protect the body from the harsh rigors of contact with the butt-end of the rod when fighting a fish. Cushion 19 is defined by an outer surface 21, and preferably by a generally cylindrical outer surface having a diameter "$d_1$" that is a multiple of the diameter "$d_2$" of fishing rod butt-end 5, on the order of from 3 to 10. Said cushion also has a length "l" that is a multiple of diameter "$d_1$" of said outer cylindrical surface 21, such as from 2 to 5, and is terminated by spaced-apart first and second cushion end surfaces 25 and 27, respectively. It is preferred that first end 25 is slightly rounded for smooth and comfortable contact with the fisher-person's body. Cushion 19 is preferably assembled axially with the fishing rod when it is this cylindrical form.

Cushion 19 is preferably made of a tough, closed-celled flexible foam. This type of foam may be made from materials such as polyvinylchloride, polyurethane, polystyrene, polypropylene, polyethylene, neoprene and mixtures thereof. The foam may be non-reticulated (closed-cell) or reticulated (open-cell), depending upon the softness of the foam and other parameters. A main object in designing the foam for making cushion 19 is to provide comfort in use, have a high enough coefficient of friction at surface 21 so that the cushion does not slip from the fisher-person's body, and retain the ability to be easily cleaned of scales, slime and other materials that are normally encountered in the capture of fish. A skinned-over foam may be useful in this situation or an open-celled surface provided it possesses the requisite surface friction so as not to slip from the user's body during the fighting of the fish. Different fishing situations may dictate different types of foam and foam structures as hereinbefore set forth. The overall importance of the invention is to have a foam that will attenuate shock between the butt-end of the rod and the fisher-person's body during the normal course of the fish-fighting episode and that will retain its shape during use. The preferred type of foam is closed-cell neoprene foam with the surface abraded to increase the coefficient of friction when presses against one's skin or clothing.

As shown in FIG. 2, a first means 29 is formed in cushion 19 for receiving fishing rod butt-end 5 in temporary fixed position therein. In its most basic design, means 29 comprises a straight passageway 31, of equal or lesser diameter than the diameter of rod butt-end 5, passing into cushion 19, and more preferably being axially aligned in cushion 19 and spanning separate central apertures 33 and 35 formed in first and second end surfaces 25 and 27, respectively. In this basic form, passageway 31 may be cylindrical in outline and formed either during the casting of cushion 19 or may be drilled after said cushion is constructed. As a separate embodiment, as shown in FIGS. 3 through 8, passageway 31 may be square, oval, triangular, star-shaped or have square-ended arms extending radially from a central passageway or in other geometries in outline to provide a certain amount of interference contact with butt-end 5. While passageway 31 may be formed at any area in said cushion, it is preferably formed axially along an axis "x" formed central to said cushion. However, as shown in FIG. 8, passageway 31 may be formed off-center at both end surfaces 25 and 27 and not parallel to central axis but at an angle thereto. All of these embodiments are contemplated within this invention.

As shown in FIG. 9, in another embodiment of the invention, a plug 37 may be temporarily or permanently inserted in fixed position in passageway 31 intermediate apertures 33 and 35 to prevent butt-end 5 of fishing rod 1 from passing completely through said cushion. By this means, cushion 19 will not ride up on rod butt-end 5 to allow exposure of said butt-end and contact between butt-end 5 and the body of the fisher-person. Said plug 37 may be placed in temporary position in cushion 19 by making it larger in diameter than passageway 31 so that it fits solidly therein by friction, or it may be glued into position using glues that are compatible with the specific foams used. In some instances, a vent hole 39 may be bored or formed through plug 37, from one end to the other, to prevent generation of unwanted suction between the plug and the butt-end of the rod. Plug 37 may be made of foam or some other material such as wood or plastic and all of these embodiments are contemplated in this invention. Plug 37 may be placed near one end of passageway 31, thereby providing the balance of the passageway to be used to accept the butt end of the fishing rod or it may be placed intermediate first and second end surfaces 25 and 27, respectively, such as at the middle of cushion 19, so that passageway 31 remains operative at both ends of cushion 19.

Figures 10, 11:
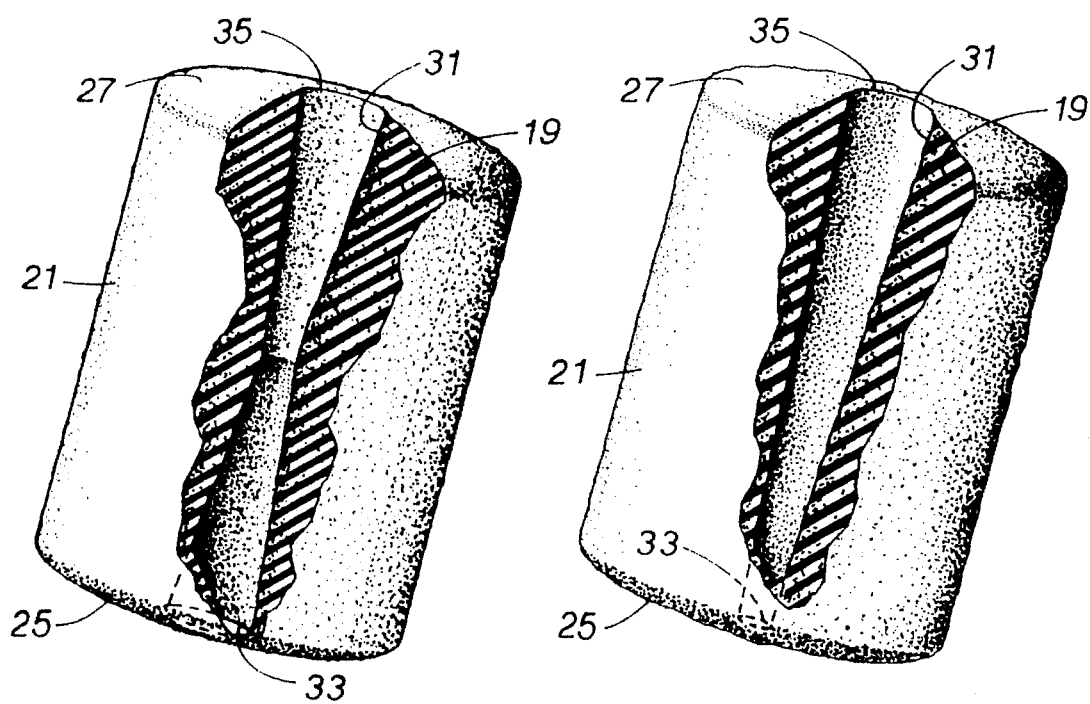
FIGS. 10 and 11 are trimetric illustrative views of the passageway in the cushion being tapered along its length to accept a wider range of rods.

As shown in FIG. 10, another embodiment of this invention shows passageway 31 in cushion 19 being tapered from one end, such as second end surface 27, along the length of passageway 31 to terminate at first end surface 25. This embodiment provides a tight, frictional fit to a wide variety of diameters of fishing rod butt-ends so that cushion 19 becomes far more useful, with a wide variety of sizes, types and lengths of fishing rods.

As shown in FIG. 11, the taper may be started at both cushion end surfaces 25 and 27 and proceed to a point interior said cushion such as at the center thereof. This allows for insertion of different diameters of rods into either end of cushion 19. Apertures 33 and 35 may be of different sizes so that rods of a wider variety or range of sizes may be used therewith. Still further, plug 37, as shown in FIG. 9, may be inserted in tapered passageway 31 to provide the abutment feature previously described. All configurations, including the use of plug 37, in vented and non-vented configuration, are contemplated in this invention.

Figures 12, 13:
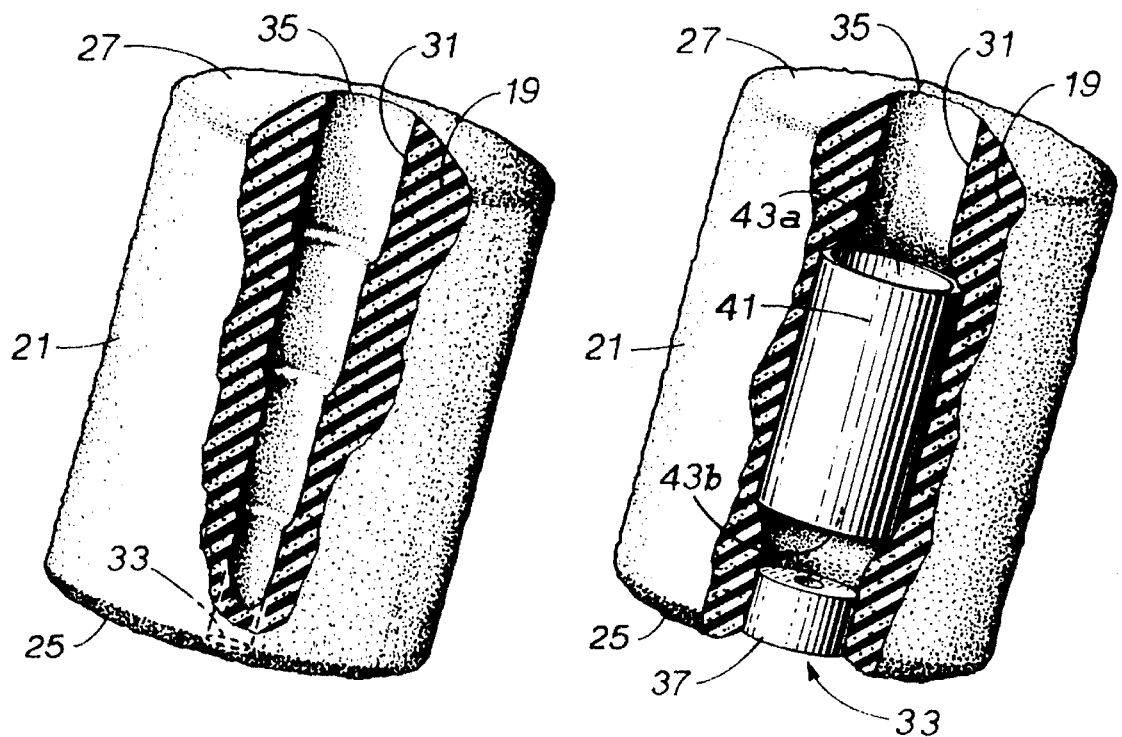
FIG. 12 is a trimetric illustrative view of another embodiment of the invention showing the passageway to be stepped in different diameters along its length.
FIG. 13 is a trimetric illustrative view of another embodiment of the passageway formed in the cushion showing it to be dilated using a hollow element inserted therein.

As shown in FIG. 12, another embodiment of this invention shows passageway 31 to be formed with its internal diameters stepped from one larger diameter to other smaller diameters along the length thereof. This configuration accommodates rod butts of different diameters and allows for easier seating of the butt-end in the passageway. The stepped condition may be from one end of said cushion to the other in gradually smaller diameters, as shown in FIG. 12, or be stepped from both ends, in gradually smaller diameters toward the middle of said cushion similar to the tapering as shown in FIG. 11. Further, plug 37 may be interposed in said passageway as shown in FIG. 9. All of these configurations, including the use of plug 37, are contemplated in this invention.

As shown in FIG. 13, another embodiment of the invention includes a hollow elongated element 41, terminated by opposed, spaced-apart open ends 43a and 43b, inserted in passageway 31, intermediate end apertures 33 and 35, to dilate or expand the size of said passageway 31 internal cushion 19. The benefit of this embodiment is that the rod will be held tightly by passageway 31 at aperture 35 above element 41 yet extend a distance down inside passageway 31 to be captured by the cushion below element 41 to provide a longer grasp to the butt-end of the rod and more stability to fishing rod 1 while in the custody and control of the fisher-person. Plug 37 may be inserted in passageway 31 below tubular element 41, as shown in FIG. 13, however this is not mandatory. Element 41 may be made from a number of different materials such as aluminum, plastic or wood. In the preferred embodiment, element 41 is a piece of polyvinylchloride (PVC) pipe that is inserted and either glued therein or held by friction in passageway 31.

Figure 14:
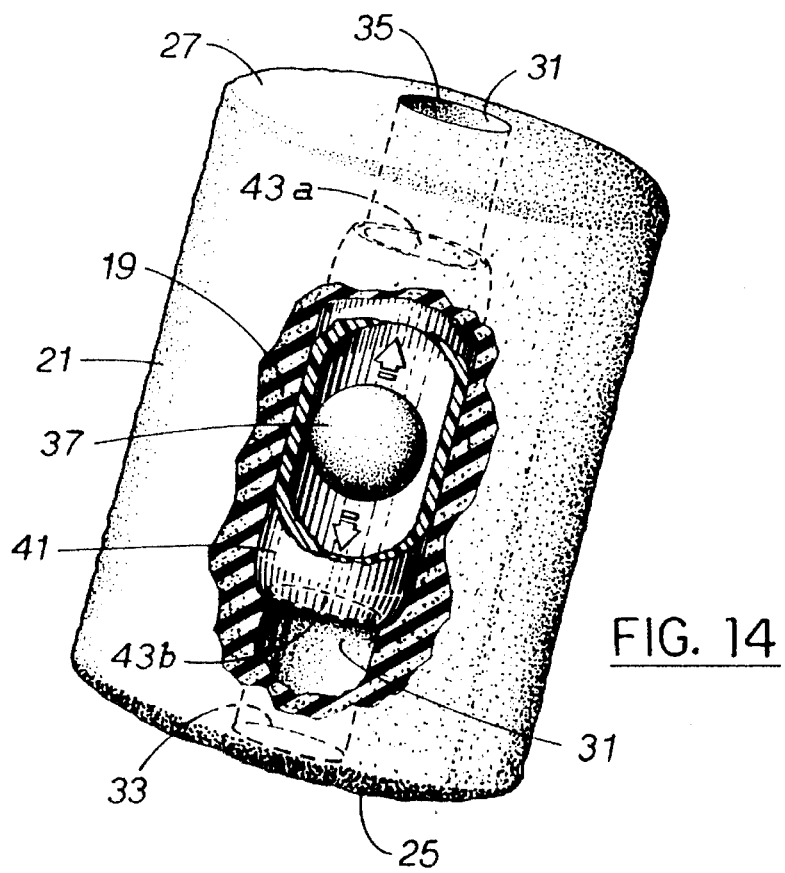
FIG. 14 is a trimetric illustrative view showing another embodiment of the manner in which the ends of the hollow element may be reduced in diameter.

An important embodiment of this invention is shown in FIG. 14 where terminal ends 43a and 43b of hollow elongated element 41 are crimped or swaged to reduce the internal diameter of element 41 at the ends thereof. A plug 37 is inserted into element 41 before the crimping operation is undertaken and is captured between the crimps for reciprocal motion therebetween. The inside diameter of the crimped ends are small enough to retain plug 37 therein but are large enough to allow insertion of the butt-end of a fishing rod therein. In this embodiment, a rod butt can be inserted in either end of element 41 and plug 37 prevents it from passing or sliding all the way through element 41.

Figure 15:
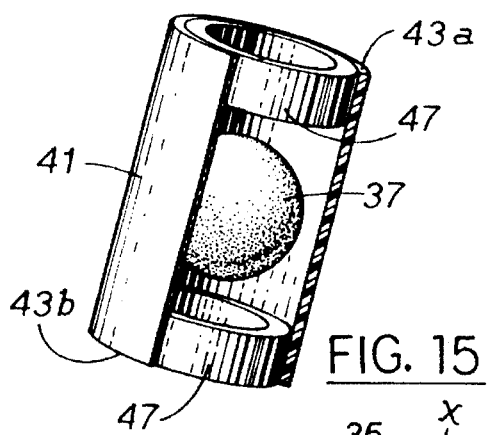
FIG. 15 is a trimetric illustrative view of another means of reducing the diameter of the hollow element to retain the plug therein.

There are other ways to reduce the internal diameter of element 41. Shown in FIG. 15 is an embodiment where a pair of collars 47 are slipped inside element 41 open ends 43a and 43b to restrict the inside diameter and are glued or otherwise attached thereto. In this embodiment the outside diameters of collars 47 match the inside diameters of element 41. The main object of this embodiment is to contain plug 37 while also accepting the butt-end of a fishing rod therein. Plug 37 can be vented as previously described.

Figure 16:
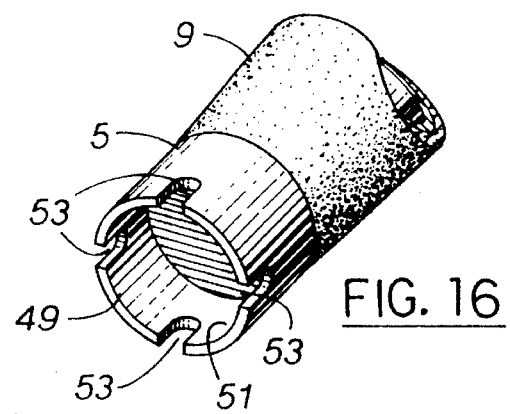
FIG. 16 is an illustrative view showing the butt-end of a typical gimbaled rod that is dealt with in with this invention.

FIG. 16 shows the butt-end 5 of a rod having positional fitting 49 formed at the end thereof. Fitting 49 comprises collar 51 extending outward from butt-end 5 in tubular alignment with lower handle 9. A series of half-circles cut-outs or radial slots 53 are formed in collar 51, mostly in pairs that set opposite each other as shown. These cut-outs are arranged for engagement with a cross-pin set in a tubular holder attached to the boat and hold the rod in a particular position while the boat is slowly moved in the water - a procedure termed "trolling". A rod having the aforesaid collar with cut-outs or slots located at the butt-end thereof is known as being gimballed.

Figure 17:
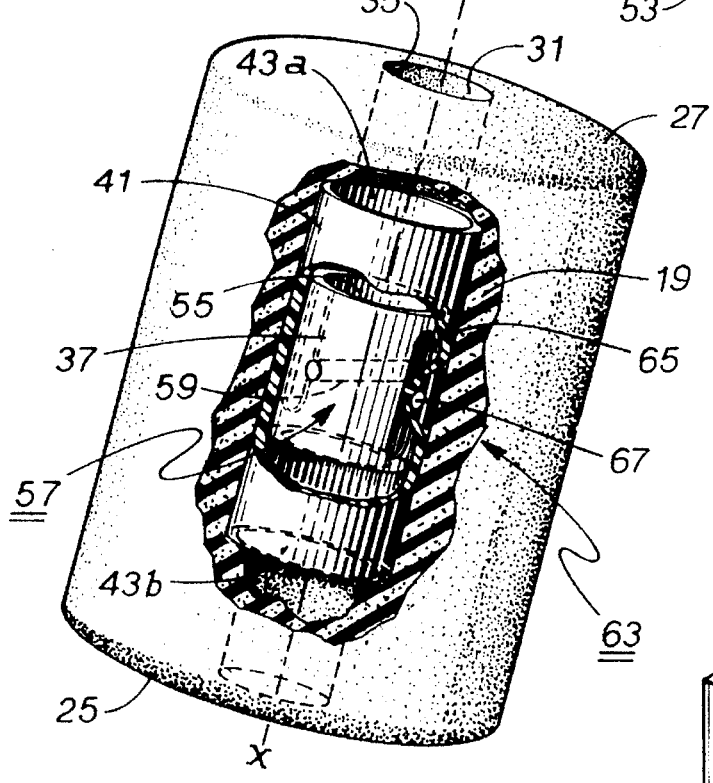
FIG. 17 is a trimetric illustrative view of one way in which this invention can handle the gimbaled end of a rod-butt and hold it against twisting in the cushion.

As shown in FIG. 17, plug 37 may be made with a cavity 55 formed at the top end thereof that faces toward aperture 35 and the end of passageway 31 for receipt therein of the butt-end of a fishing rod. In cavity 55, preferably at or near the base thereof, is a second means 57 for capturing a pair of radial slots or cut-outs 53 to prevent twisting of the rod when using this invention. As shown in FIG. 17, means 57 takes the form of a cross-pin 59 mounted in plug 37 and in cavity 55 for receipt thereover of cut-outs 53.

Figure 18:
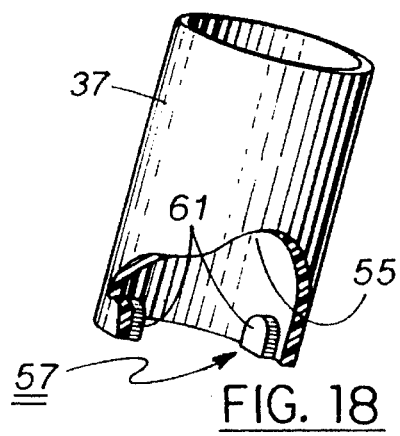
FIG. 18 is a trimetric illustrative view of another form of the means by which this invention can handle the gimbaled end of a rod-butt and hold it against twisting; and, FIGS. 19 and 20 are trimetric illustrative and cross-sectional views, respectively, of other means by which this invention can hold a gimbaled rod-butt end against twisting.

Means 57 may take forms other than a simple cross-pin. As shown in FIG. 18, means 57 may comprise a pair of small, spaced-apart lands 61 formed, such as by molding, at or near the base of cavity 55 and set apart from each other. Upon inserting butt-end 5 of a rod into passageway 31, it slides down into element 41 and into cavity 55 so that cut-outs 53 fit over lands 61 in interlocking engagement.

In this embodiment, it is important to confine the reciprocal motion of plug 37 and plug 37 itself to rectilinear motion and not allow the plug to twist or turn in element 41. As shown in FIG. 17, a third means 63 is provided to prevent twisting of plug 37. In this embodiment, a shallow groove 65 in its outer surface of plug 37 that is directed parallel to the central axis x—x of element 41. A short stub 67 is inserted in the wall of hollow element 41 and arranged to depend into said groove. This combination of stub and groove confines the motion of plug 37 to rectilinear motion and prevents it from turning with respect to element 41. Other means of inhibiting twisting include placing tracks on plug 37 that mate with runners on element 41 and vice versa.

Figure 20:
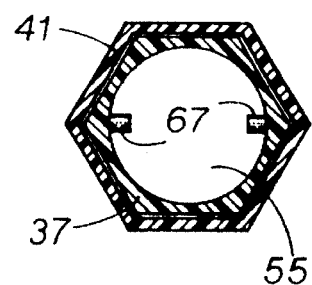
Figure 19:
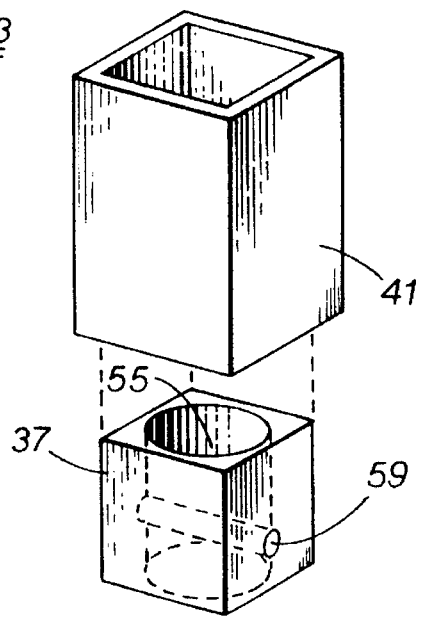

As shown in FIGS. 19 and 20, other means of preventing twisting of plug 37 include making hollow element 41 in the form of a polygon cross-section such as a square (FIG. 19) or hexagon (FIG. 20) and making plug 37 with an outside configuration that will fit in said geometric shape for rectilinear movement therein without twisting. Examples of these would be square tubes with square plugs (FIG. 19), rectangular tubes with rectangular plugs, octagonal tubes with octagonal plugs and a hexagonal tube with a hexagonal plug (FIG. 20). A wide choice of elements 41 and plugs 37 are available for this purpose and are contemplated in this invention.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. An elastic, portable cushion for enveloping a butt-end of a fishing rod for interposition with the fisher-person's body, to protect the body when fighting a fish, said cushion having a width at least 3 times the diameter of the fishing rod and having the property of generally retaining its shape during use and defined by an outer surface having a high coefficient of friction including first means formed therein for receiving said butt-end of said rod in fixed position therein, said means comprising a passageway, of equal or lesser diameter than the butt-end of the fishing rod, passing into said cushion to removably retain the rod therein by friction.

2. The cushion of claim 1 wherein said outer surface is defined by an outer generally cylindrical surface, for assembly axially with the rod, having a diameter that is a multiple of the diameter of the fishing rod butt-end and a length that is a multiple of the diameter of said outer cylindrical surface, and terminated by spaced-apart first and second cushion end surfaces wherein, upon assembly with a rod, said first end surface is exterior said rod and said passageway passes completely through said cushion through central apertures formed in said first and second end surfaces.

3. The cushion of claim 2 wherein the diameter of said cylindrical surface is from 3 to 10 times the diameter of the fishing rod.

4. The cushion of claim 2 wherein the length of said cylindrical surface is from 2 to 5 times the diameter of the cushion.

5. The cushion of claim 2 wherein said passageway is axially aligned in said cushion and is straight.

6. The cushion of claim 2 wherein said passageway is tapered from a first diameter to a smaller, second diameter inboard from both cushion end surfaces toward the middle of said cushion.

7. The cushion of claim 6 further including a plug inserted in fixed position in said passageway to prevent the butt-end of the fishing rod from passing completely through said cushion.

8. The cushion of claim 2 wherein said passageway is formed with diameters of different sizes stepped to smaller sizes inward from both cushion end surfaces toward the middle of said cushion.

9. The cushion of claim 8 further including a plug inserted in fixed position in said passageway to prevent the butt-end of the fishing rod from passing completely through said cushion.

10. The cushion of claim 1 wherein the cross-sectional shape of said passageway is circular.

11. The cushion of claim 1 wherein the cross-sectional shape of said passageway is square.

12. The cushion of claim 1 wherein the cross-sectional shape of said passageway is triangular.

13. The cushion of claim 1 further including a plug inserted in fixed position in said passageway to prevent the butt-end of the fishing rod from passing completely through said cushion.

14. The cushion of claim 13 wherein said plug has formed therethrough a bore to relieve any suction that may possibly build up in said passageway.

15. The cushion of claim 1 wherein said passageway is tapered from a first diameter to a smaller, second diameter along the length thereof to provide a frictional fit to the butt-end of the fishing rod.

16. The cushion of claim 15 further including a plug inserted in fixed position in said passageway to prevent the butt-end of the fishing rod from passing completely through said cushion.

17. The cushion of claim 1 wherein said passageway is formed with diameters of different sizes stepped to smaller sizes inward from said cushion end surface to accommodate rod butt-ends of different diameter.

18. The cushion of claim 17 further including a plug inserted in fixed position in said passageway to prevent the butt-end of the fishing rod from passing completely through said cushion.

19. The cushion of claim 1 wherein said first means further includes a hollow elongated element having opposed, open ends inserted in said passageway to dilate the size thereof.

20. The cushion of claim wherein said first means further includes a plug inserted in said passageway to prevent the butt-end of the fishing rod from passing completely through said cushion.

21. The cushion of claim 19 wherein said first means further includes:

a) a crimp at both ends of said hollow elongated element; and, b) a plug received in said elongated element intermediate said crimped ends for reciprocal movement therein;

c) wherein the diameter of said crimped ends of said element is sufficiently small to prevent the escape therefrom of said plug and, at the same time, being sufficiently large to receive therethrough the butt-end of a fishing rod.

22. The cushion of claim 19 wherein said first means further includes:

a) a pair of short collars having outside diameters equal to the inside diameter of said elongated element, inserted in said open ends of said element and fixed therein to reduce the inside diameter of said ends; and b) a plug received in said elongated element intermediate said reduced diameter ends for reciprocal movement therein;

c) wherein the diameter of said reduced diameter ends of said element is sufficiently small to prevent the escape therefrom of said plug and, at the same time, being sufficiently large to receive therethrough the butt-end of a fishing rod.

23. The cushion of claim 1 wherein said cushion is made from material selected from the group consisting of resilient polyurethane foam, polyvinylchloride foam, polystyrene foam, polypropylene foam, neoprene foam and mixtures thereof.

24. A portable elastic cushion for enveloping the butt-end of a gimballed fishing rod, where said gimbal includes a collar extending outward from said butt-end, in tubular alignment with said rod, and having formed therein a series of radial slots, for interposition with the fisher-person's body, to protect the body when fighting a fish, said cushion having the property of generally retaining its shape during use and defined by an outer surface having a high coefficient of friction including first means formed therein for receiving the butt-end of the rod in fixed position therein, said first means comprising:

a) a passageway, of equal or lesser diameter than the butt-end of the fishing rod, passing through said cushion and spanning separate central apertures formed in said end surfaces:

b) a hollow elongated element, terminated by opposed, spaced-apart open ends, inserted in said passageway, intermediate said end apertures to dilate the size of said passageway;

c) a plug received in said elongated element for reciprocal movement therein;

d) second means in said plug for capturing the gimballed butt-end of the fishing rod therein; and, e) third means for restricting the reciprocal movement of said plug and the rod to rectilinear movement only.

25. The cushion of claim 24 wherein said second means includes a cavity formed in said plug and a pair of small, spaced-apart lands formed at the base of said cavity to receive thereover said slots at the butt-end of the gimballed rod in interlocking engagement therewith.

26. The cushion of claim 24 wherein said second means includes a cavity formed in said plug and a cross-pin mounted at the base of said cavity to receive thereover said slots at the butt-end of the gimballed rod in interlocking engagement therewith.

27. The cushion of claim 24 wherein said third means includes a groove formed in said plug and a stub in said hollow element arranged to depend into said groove to prevent twisting of said plug as it moves reciprocally in said element.

28. The cushion of claim 24 wherein said third means includes forming said hollow, elongated element with a polygon cross-section and forming said plug with a similar polygon cross-section of slightly smaller size to allow said plug to reciprocate in said element without twisting.

29. The cushion of claim 28 wherein said polygon is selected from the group consisting of triangular, square, rectangular, pentagonal, hexagonal, octagonal, nonagonal and decagonal cross-sections.

* * * * *